3,385,812
FINISHING COMPOSITION COMPRISING A FLUOROCHEMICAL AND A POLY-ORGANOSILOXANE
Armand E. Brachman, Newburgh, N.Y., assignor to E. I. du Pont de Nemours and Company, Wilmington, Del., a corporation of Delaware
No Drawing. Continuation-in-part of application Ser. No. 467,119, June 25, 1965. This application Apr. 13, 1966, Ser. No. 542,228
17 Claims. (Cl. 260—29.6)

This application is a continuation-in-part of application Ser. No. 467,119, filed June 25, 1965, now abandoned.

This invention relates to liquid finishing compositions which are blends of certain fluorochemicals and certain polyorganosiloxanes, to methods for making articles oil and water repellent with them, and to the treated articles themselves. In a more specific embodiment, the invention is directed to finishing compositions and methods for making synthetic polymeric sheet materials, especially sueded sheet materials, oil, stain, water and adhesive repellent.

Fluorochemicals are, of course, well known as oil and stain repellents. It is also generally known that the repellency properties of these compounds are adversely affected by silicones. It has now been found, according to this invention, that by selecting silicones from a particular class of curable substantially linear polyorganosiloxanes, one can prepare finishing compositions containing both fluorochemicals and silicones which not only retain the desirable properties of the fluorochemicals but, in addition, give the treated materials a degree of abrasion resistance and hand which cannot be obtained when the fluorochemicals are used by themselves.

Although a wide variety of materials can be treated with these compositions, they are especially useful for treating synthetic polymeric sheet materials, especially sueded sheet materials. Treatment of such materials, which ordinarily have poor oil, stain and water repellency, enhances these properties as well as the materials' ability to repel most of the adhesives used in fabricating articles from the materials. In addition, the treatment gives the suede materials exceptional burnish resistance, superior hand, enhanced color brilliance and outstanding jetness in black. It also makes the materials easier to clean.

The fluorochemicals used in the compositions of the invention contain perfluoroalkyl moieties attached to various other moieties. One such fluorochemical, type (A), is polymeric; at least 35% (by weight) of the monomers used to make this fluoropolymer can be represented by the formula (A)
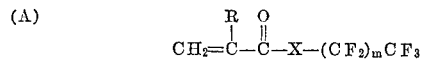

where

R can be H, —CH$_3$, —CH$_2$CH$_3$ or halogen
X can be —O—(CH$_2$)$_n$—
—NH—(CH$_2$)$_n$—
—O—(CH$_2$)$_n$—N(H)—SO$_2$—
—O—(CH$_2$)$_n$—N(R′)—SO$_2$—
—S—(CH$_2$)$_n$—
—O—(CH$_2$)$_n$—N(H)—SO$_2$—(CH$_2$)$_n$—
—O—(CH$_2$)$_n$—N(R′)—SO$_2$—(CH$_2$)$_n$— or

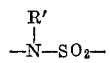

where $n$ is a number 1 through 14 and R′ is an alkyl radical of 1 through 6 carbon atoms, and $m$ is a number 1 through 13.

This means that the polymer can be a homopolymer of such monomer units. As a general rue, however, the monomers of Formula A will be copolymerized with other ethylenically unsaturated monomers such as alkyl acrylates and alkyl methacrylates; vinyl esters of aliphatic acids; styrene and alkyl styrenes; vinyl halides; vinylidene halides; hexafluoropropene; allyl esters; vinyl alkyl ketones; acrylamides; and dienes such as 1,2-butadiene, 1,3-butadiene, 2-chloro-1,3-butadiene, 2,3-dichloro-1,3-butadiene and isoprene.

Another type of fluorochemical, type (B), can be represented by the structure (B)
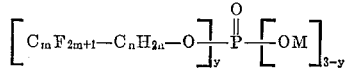

where

M is a water solubilizing cation such as hydrogen, alkali-metal, ammonium or substituted ammonium;
$y$ is a number of average value from 1.0 to 2.5;
$m$ is a number 4 through 12; and
$n$ is a number 1 through 16; with C$_m$ and C$_n$ making up a straight chain of not less than 8 carbon atoms.

Fluorochemicals (A) and (B) are disclosed in U.S. applications S.N. 404,519, filed Oct. 27, 1964, and S.N. 288,894, filed June 19, 1963, and in U.S. Patent 3,083,224, as are methods for preparing them. The patent and applications just mentioned are incorporated into this application for the sole purpose of further describing these fluorochemicals and to show methods for their preparation.

The polyorganosiloxanes used in the compositions of the invention are curable substantially linear polymers represented by the general formula

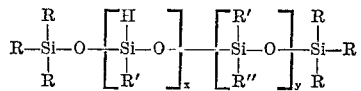

wherein R, R′ and R″ can be methyl, ethyl, propyl, phenyl, —OCH$_3$ or —OC$_2$H$_5$.

However, 60 through 100 mol percent of these substituents must be methyl. The silicon atoms within the brackets must bear from about 0.3 to 1 hydrogen atom and from 1 through 1.7 R′ or R″ groups each, the total, of course, being two. The valve of $x$ and $y$ must be such that the molecular weight of the polymer is at least 500.

By "curable polyorganosiloxane" is meant a lower molecular weight siloxane which can be converted to a higher molecular weight non-migratory form. Polyorganosiloxanes of this type are available commercially.

The fluorochemicals used in the finishing compositions of the invention are ordinarily made and supplied as aqueous dispersions, as organosols, as emulsions, or as solutions in water or organic solvents such as "Freon"® fluorocarbon. This is described in more detail in the previously mentioned U.S. applications S.N. 404,519 and S.N. 288,894, and in U.S. Patent 3,083,224. Fluorochemicals preferred for use in the compositions of the invention are usually provided as aqueous dispersions containing from about 20–50% by weight of fluorochemical solids.

The polyorganosiloxanes are ordinarily supplied as aqueous emulsions or as solutions in such organic solvents as perchloroethylene or Stoddard solvent. Polyorganosiloxanes preferred for use in the compositions of the invention are usually provided as aqueous emulsions containing about 40% by weight of polymer solids.

To make a composition of the invention for general use one simply selects suitable components, in suitable and compatible liquid forms, and blends them to provide from 10% through 75%, preferably 25% through 45% of a polyorganosiloxane and from 25% through 90%, preferably 50% through 75%, of a fluorochemical, by weight of the total of fluorochemicals and polyorganosiloxane. The precise ratio of siloxane to fluorochemical in a composition will depend upon the degree of repellency, etc. desired, the material to be treated and like factors, and can be easily determined by one skilled in the art.

Similarly, the total amount of fluorochemical and siloxane in a composition will vary according to material being treated, the equipment being used, and like factors. Generally, the compositions will contain from about 5% through 15%, by weight of the total composition, of combined fluorochemical and siloxane solids.

The blending is done in conventional mixing equipment, preferably a propeller-type apparatus. A mixing time of 15 through 30 minutes is usually sufficient. After blending, the compositions are ready for use.

Although a polyorganosiloxane curing agent is not essential in the compositions of the invention, it is preferred that such agents be present because the polysiloxanes cure rather slowly by themselves, even on application of heat. Illustrative of the curing agents which can be used are zinc salts, zinc soaps, tin salts, tin soaps and organic amines. Examples of these are zinc stearate, zinc acetate, dibutyl tin dilaurate and dibutyl tin diacetate. The polysiloxane curing agents are usually provided as aqueous dispersions and are ordinarily present in the compositions of the invention at concentrations which give 2 through 5% by weight of metal based on the polyorganosiloxane solids in the compositions. A curing agent preferred for the stability it gives the polyorganosiloxane emulsions is "Y-4306" made and sold by the Union Carbide Co.

The foregoing describes compositions for general finishing use, which are simply applied to the material to be treated. It has been found, however, that the fluorochemicals and polyorganosiloxanes can be incorporated directly into a suede sheet material during its manufacture. Such a suede material will have the same desirable characteristics as are obtained when these substances are applied on its surface. To incorporate the fluorochemicals and polyorganosiloxanes directly into a suede material, one coats a substrate with a composition comprising a fluorochemical and a polyorganosiloxane contained in a polyurethane-polyvinyl chloride solution and then treats this topcoat by coagulating, leaching, drying and then abrading it as described in copending application S.N. 216,576, filed Aug. 13, 1962 now U.S. Patent 3,284,274. That application is incorporated into this one for the sole purpose of disclosing suitable substrates, polymer solutions and process details for making suede material.

The fluorochemicals will be present in such coatings at concentrations of from 0.018 ounce/square yard to 0.08 ounce/square yard, and the polyorganosiloxanes will be present at concentrations of 0.0018 ounce/square yard to 0.008 ounce/square yard. These compositions are made by dissolving suitable amounts of the fluorochemical and polyorganosiloxane in dimethyl formamide and then adding this solution to an appropriate amount of a solution of a polyurethane in dimethyl formamide.

The compositions of the invention can be used to give a high degree of oil repellency and water repellency to fabrics made of cotton, nylon, polyurethanes, polyimides, polyesters, polyacrylics, glass, asbestos, hemp, burlap, wool, cellulose acetate, regenerated cellulose and the like, and also to solid materials such as wood, plastic, asphalt, rubber and linoleum. As already mentioned, the compositions are especially useful for conferring oil repellency, water repellency, adhesive repellency, burnish resistance, superior hand and feel and superior stain resistance to synthetic organic polymeric sheet materials, especially sueded sheet materials.

For general finishing use, the Formula A fluorochemicals are preferred. Highly preferred because of their availability and the excellence of results obtained with them are copolymers of a monomer having the structure (D) 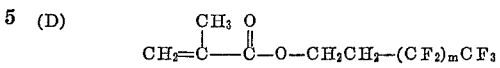

where $m$ is a number 1 through 13, with other acrylic or methacrylic esters.

Especially preferred for general finishing use, for the same reasons, are terpolymers of monomers of Formula D, n-butyl acrylate and N-methylol acrylamide. Most preferred is a terpolymer of (a) A mixture of Formula D monomer compounds in which $m$ is 6, 8 and 10 in a 3:2:1 numerical ratio with small amounts of 12 and 14 present;
(b) n-Butyl acrylate; and
(c) N-methylol acrylamide;

the monomer unit weight ratio of this terpolymer being 1000/20/3, respectively. This terpolymer will hereinafter be called the "1000/20/3 terpolymer."

When compositions containing fluorochemical, polyorganosiloxane and polyurethane are used in the preparation of suede material, the Formula B fluorochemicals are preferred because of their solubility in dimethylformamide.

Especially preferred for the same reasons are type (B) fluorochemicals represented by the formulae (E) 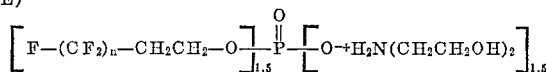

(F) 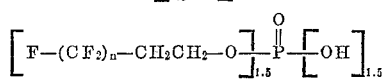

and (G) 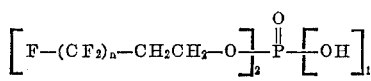

In these three formulae, $n$ is 6, 8 and 10 in a numerical ratio of 3:2:1.

As to the polyorganosiloxanes, those of Formula C wherein R, R' and R" are —CH$_3$ are preferred because of the quality of the product obtained when they are used. Polyorganosiloxanes particularly preferred for the same reason are "Y-4034," made and sold by the Union Carbide Co. and "Syl-off" 22, made and sold by the Dow-Corning Co.

The compositions of the invention intended for general use are applied to substrates at concentrations which will give from 0.05 to 0.4 oz. (dry basis)/sq. yd. of material. For most uses, however, concentrations of from 0.1 to 0.15 oz./sq. yd. are satisfactory.

The compositions are applied to the substrates by conventional methods. They can, for example be applied by dipping, brushing, spraying, or by direct gravure application. After the compositions have been applied, they can be air dried. For optimum repellency characteristics, however, especially when the compositions are used to treat sueded sheet materials, they are heat cured for from about 1½ to 6 minutes at a temperature of from about 230–280° F.

In a variation of this method, the fluorochemicals, and polyorganosiloxanes, in solution or dispersion, can be applied separately, at the concentrations they are applied together, and dried to provide layered finishes which give the treated materials the same desirable properties as though the fluorochemicals and polyorganosiloxanes were applied in combination.

The urethane polymer compositions containing fluorochemical and polyorganosiloxane, used directly in preparing sueded sheet materials, are applied at concentrations which will give a total of 0.15 to 0.5 ounce of fluorochemical and siloxane/square yard of substrate material. These compositions are applied by extrusion coating, cured, and then abraded to form a suede finish.

The following examples are presented so that the invention will be more easily understood and readily practiced. All parts are by weight unless otherwise indicated.

Example 1

| | Parts |
|---|---|
| An aqueous dispersion of 1000/20/3 terpolymer (22.3% solids) | 60.1 |
| Water | 324.6 |
| Triton X-100 (isooctyl phenyl polyethoxy ethanol Rohm & Haas Co.) | 0.6 |
| Union Carbide "Y-4034" (a polyorganosiloxane emulsion containing 40% solids) | 16.7 |

These components were blended for about 1 minute with a propeller agitator and then sprayed on a synthetic polymeric sueded sheet material prepared according to Example 2 of application S.N. 216,576, filed Aug. 13, 1962 to give a concentration of about 0.15 oz. (dry basis)/sq. yd. The material was then baked at 230° F. for 3 minutes.

The material thus treated showed the following characteristics, as contrasted with the same material left untreated:

| | Treated | Untreated |
|---|---|---|
| Water repellency rating [1] (100 is perfect). | 70 | 0. |
| Oil repellency [2] (9 is perfect). | 5.5 | <2. |
| Adhesive repellency [3] (10 is perfect). | Excess adhesive flicked off—9.5. | Adhesive couldn't be removed without gouging suede surface—5. |
| Hand | Silky, buttery | Harsh. |
| Burnish resistance (fingernail scuff test). | Mildly glazed | Completely cut through topcoat. |

[1] AATCC Standard Test Method 22-1952.
[2] A drop of test solution is placed on the material on a flat horizontal surface. After two minutes, any penetration or wicking into the fabric is noted visually. To aid in the observation, the test solution should contain a small amount of oil-soluble blue dye. The nature of the test solutions is shown below; Nujol of course is a purified petroleum oil. Anything with a rating of five or greater is good or excellent; anything with a rating of one or over can be used for certain purposes. If a treated fabric repels the No. 1-6 solutions but not the Number 7 solution, its rating is 6.

| Oil Repellency Rating: | Test Solution |
|---|---|
| 9 | n-Hexane. |
| 8 | n-Heptane. |
| 7 | n-Octane. |
| 6 | n-Decane. |
| 5 | n-Dodecane. |
| 4 | n-Tetradecane. |
| 3 | n-Hexadecane. |
| 2 | 50-50 hexadecane-Nujol. |
| 1 | Nujol. |

[3] Determined with six adhesives:
1. BB Chem. Co., TEX No. 823.
2. BB Chem. Co., TEX No. 821.
3. Naugatuck Chem. Co., Adhesive No. 165A.
4. United Shoe Machinery Co., HUB No. 1869.
5. BB Chem. Co., No. 678.
6. BB Chem. Co., Bond S-727.

A drop of each of these adhesives is placed on the surface of the material to be tested and air dried overnight. The adhesive is then removed with a piece of cheesecloth wetted with naphtha. The degree of damage by each adhesive to the surface is rated as follows:

| 10 | No damage. |
|---|---|
| 9 | Very slight discoloration. |
| 8 | Slight discoloration. |
| 7 | Medium color change. |
| 6 | Surface slightly gouged. |
| 5 | Surface roughened markedly. |
| 4 | |
| 3 | |
| 2 | Surface deeply gouged. |
| 1 | Adhesive cannot be removed. |

The results are then averaged.

Example 2

| | Parts |
|---|---|
| The 1000/20/3 terpolymer dispersion of Example 1 | 14.98 |
| Water | 80.78 |
| Triton X-100 | 0.08 |
| "Y-4034" polyorganosiloxane (Union Carbide Co.) | 3.47 |
| "Y-4306" polyorganosiloxane curing agent (40% solids) (Union Carbide Co.) | 0.69 |

These ingredients were blended and applied to a suede material as in Example 1, to give a concentration of 0.14 oz./sq. yd. (dry basis). The material was then baked at 230° F. for six minutes.

The treated material had the following characteristics, as contrasted with the same untreated material:

| | Treated | Untreated |
|---|---|---|
| Water repellency | 80 | 0. |
| Oil repellency | 6 | <2. |
| Adhesive repellency | Flicked off—9.5 | Couldn't be removed without gouging surface—<5. |
| Hand | Silky, buttery | Harsh. |
| Burnish resistance (fingernail scuff). | Mildly glazed | Completely cut through topcoat. |

Example 3

| | Parts |
|---|---|
| An aqueous dispersion of a 40/60 copolymer of stearyl methacrylate and Formula D monomer where $m=6$, 8 and 10 in a 3:2:1 weight ratio, with small amounts of 12 and 14 present (25% solids) | 120 |
| Water | 910 |
| Triton X-100 | 1 |
| Y-4034 polyorganosiloxane | 57.5 |
| Y-4306 curing agent | 11.5 |

These components were blended and applied to a sueded sheet material as in Example 1, to give a concentration of 0.11 oz./sq. yd. (dry basis). The material was then air dried.

The material thus treated showed the following characteristics, as contrasted with the same untreated material:

| | Treated | Untreated |
|---|---|---|
| Water repellency | 80 | 0 |
| Oil repellency | 6.5 | <2 |
| Adhesive repellency | 9.8 | <5 |
| Hand | (1) | |
| Burnish resistance | (2) | |

[1] Slightly improved over untreated.
[2] Slightly improved over untreated material.

The following fluorochemical monomers can be substituted, in equivalent amounts, for the Formula D fluorochemical monomer used in Example 3. The resulting composition can be applied to suede material with substantially the same results:

Example 4

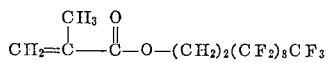

Example 5

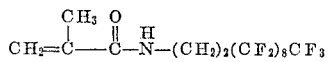

Example 6

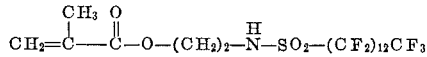

Example 7

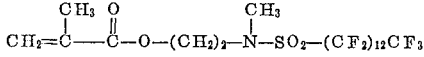

Example 8

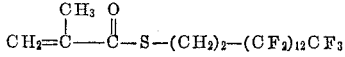

Example 9

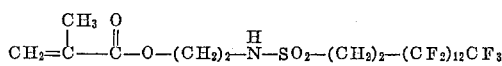

$$CH_2=\overset{CH_3}{\underset{|}{C}}-\overset{O}{\underset{\|}{C}}-O-(CH_2)_2-\overset{H}{\underset{|}{N}}-SO_2-(CH_2)_2-(CF_2)_{12}CF_3$$

Example 10

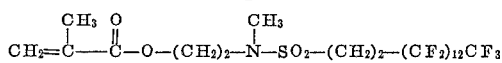

$$CH_2=\overset{CH_3}{\underset{|}{C}}-\overset{O}{\underset{\|}{C}}-O-(CH_2)_2-\overset{CH_3}{\underset{|}{N}}-SO_2-(CH_2)_2-(CF_2)_{12}CF_3$$

Example 11

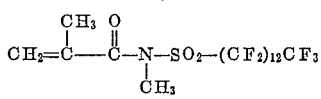

$$CH_2=\overset{CH_3}{\underset{|}{C}}-\overset{O}{\underset{\|}{C}}-\underset{\underset{CH_3}{|}}{N}-SO_2-(CF_2)_{12}CF_3$$

Example 12

| | Parts |
|---|---|
| The 1000/20/3 terpolymer disperson of Ex. 1 | 109 |
| Water | 101.9 |
| Triton X-100 | 0.7 |
| Glacial acetic acid | 0.8 |
| "Syl-off" 22 (Dow-Corning Co.—an aqueous dispersion of a polyorganosiloxane containing 40% solids) | 27.2 |
| "Syl-off" 22-A (Dow-Corning Co.—an aqueous disperson of a polyorganosiloxane curing agent, 24% solids) | 5.4 |

These components are blended and applied to a suede material (prepared according to Example 2 of application S.N. 216,576, filed Aug. 13, 1962) by direct gravure to give a concentration of 0.28 oz./sq. yd. (dry basis). The material is then baked for 1.5 minutes at 280° F.

This treated material shows the following characteristics, as contrasted with the same material left untreated:

| | Treated | Untreated |
|---|---|---|
| Water repellency | 70 | 0. |
| Oil repellency | 7 | <2. |
| Adhesive repellency | 9 | <5. |
| Hand | Silky, buttery | Harsh. |
| Burnish resistance | Mildly glazed | Completely cut through topcoat |

Example 13

A suede material (prepared according to Example 2 of application S. N. 216,576, filed Aug. 13, 1962) was first sprayed with the following composition:

| | Parts |
|---|---|
| "Syl-off" 22 (40% solids) | 100 |
| "Syl-off" 22-A | 20 |
| Acetic Acid | .125 |
| Hydroxyethyl cellulose (10% aqueous solution) | 67.2 |
| Deionized Water | 854 |

This material was then dried for 4 minutes at 110° C. and a second layer of the following composition was then sprayed on:

| | Parts |
|---|---|
| Aqueous dispersion of the fluorochemical of Formula E (33% solids) | 100 |
| Isopropyl alchohol | 276 |
| Water | 276 |

This second layer was then dried for 4 minutes at 110° C.

The total amount of finish applied with both layers was about 0.1 oz. (dry basis)/sq. yd., and each layer made up about ½ of the total dry weight of the finish.

The sueded material showed the following characteristics as compared to an untreated control:

| | Treated | Untreated |
|---|---|---|
| Water repellency | 60 | 0 |
| Oil repellency | 4 | 2 |
| Hand | (¹) | (²) |

¹ Very pleasant. ² Harsh.

The fluorochemicals of Formulae F and G can be substituted for the fluorochemical of Formula E, in the same amounts, and will give equivalent results.

Example 14

A composition was prepared containing the following components:

| | Parts |
|---|---|
| Pigment ¹ | 2.2 |
| Polyvinyl chloride/polyurethane blend as disclosed in Example 3 of U.S.P. 3,180,853 | 15.0 |
| Dimethyl formamide | 3.1 |
| Fluorochemical of Formula G | 0.2 |
| Silicone oil Y-5197 (Union Carbide Co.) | 0.009 |

¹ See the following table:

| Pigment: | Percent |
|---|---|
| White pigment | 13.25 |
| Yellow pigment | 1.58 |
| Orange pigment | 0.13 |
| Black pigment | 0.04 |
| Methyl ethyl ketone | 62.5 |
| Vinyl chloride/vinyl acetate 80/20 copolymer | 22.5 |

These components were thoroughly blended with a propeller agitator and the blend was then extruded to a thickness of 20 to 30 mils on a substrate according to the directions in Example 2 of application S.N. 216,576, filed Aug. 13, 1962.

This material showed the following characteristics as compared to an untreated control:

| | Treated | Untreated |
|---|---|---|
| Water repellency | 50 | 0 |
| Oil repellency | 7 | <2 |

I claim:
1. A composition comprising
   (A) a fluorochemical which is
   (1) a substantially linear polymer of ethylenically unsaturated monomers, at least 35% (by weight) of said monomers being represented by the formula

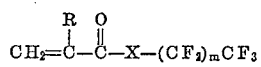

$$CH_2=\overset{R}{\underset{|}{C}}-\overset{O}{\underset{\|}{C}}-X-(CF_2)_mCF_3$$

where
R can be H, —CH$_3$, —CH$_2$CH$_3$ or halogen
X can be —O—(CH$_2$)$_n$—

—NH—(CH$_2$)$_n$—

—O—(CH$_2$)$_n$—$\overset{H}{\underset{|}{N}}$—SO$_2$—

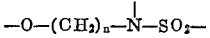
—O—(CH$_2$)$_n$—$\overset{R'}{\underset{|}{N}}$—SO$_2$—

—S—(CH$_2$)$_n$—

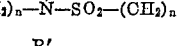
—O—(CH$_2$)$_n$—$\overset{H}{\underset{|}{N}}$—SO$_2$—(CH$_2$)$_n$

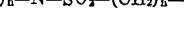
—O—(CH$_2$)$_n$—$\overset{R'}{\underset{|}{N}}$—SO$_2$—(CH$_2$)$_n$— or

—$\overset{R'}{\underset{|}{N}}$—SO$_2$— where $n$ is a number 1 through 14 and
R' is an alkyl radical of 1 through 6 carbon atoms, and
$m$ is a number 1 through 13;
or (2) a compound represented by the formula

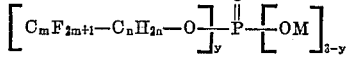

$$\left[C_mF_{2m+1}-C_nH_{2n}-O\right]_y\overset{O}{\underset{\|}{P}}\left[OM\right]_{3-y}$$

where M is hydrogen, alkali-metal, ammonium or substituted ammonium;
y is a number of average value from 0.1 to 2.5;
$m$ is a number 4 through 12;
$n$ is a number 1 through 16;

with $C_m$ and $C_n$ making up a straight chain of not less than 8 carbon atoms;

(B) a curable substantially linear polyorganosiloxane represented by the structure

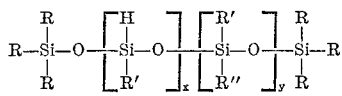

where R, R' and R" can be —$CH_3$, —$C_2H_5$, —$C_3H_7$, phenyl, —$OCH_3$ or —$OC_2H_5$, 60% through 100% (mol) being —$CH_3$ and the silicon atoms within the brackets each bearing from 0.3 to 1 hydrogen atoms and from 1 through 1.7 R groups, the total being two;

$x$ and $y$ are numbers which will give the siloxane a molecular weight of at least 500;

the amount of fluorochemical in the composition being 25% through 90% and the amount of polyorganosiloxane being 10% through 75%, by weight of the total of (A) and (B); and (C) a liquid carrier.

2. A composition according to claim 1 wherein the fluorochemical in subheading (A) is a polymer as described in subheading (1).

3. A composition according to claim 1 wherein the fluorochemical in subheading (A) is a compound as described in subheading (2).

4. A composition according to claim 2 wherein the fluorochemical is a substantially linear polymer of ethylenically unsaturated monomers, at least 35% (by weight) of said monomers having the structure $$CH_2=\overset{CH_3}{\underset{|}{C}}-\overset{O}{\underset{\|}{C}}-O-CH_2CH_2(CF_2)_mCF_3$$

where $m$ is a number 1 through 13.

5. A composition according to claim 4 wherein the fluorochemical is a terpolymer of (a) a mixture of $$CH_2=\overset{CH_3}{\underset{|}{C}}-\overset{O}{\underset{\|}{C}}-O\ CH_2CH_2(CF_2)_mCF_3$$

where $m=6,8$ and 10 in a 3:2:1 numerical ratio with a small amount of 12 and 14 present;

(b) n-butyl acrylate, and (c) N-methylol acrylamide, the weight ratios of (a), (b) and (c) being 1000/20/3 respectively.

6. A composition according to claim 3 wherein the fluorochemical is one represented by the formula

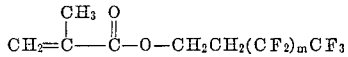

where $n$ is 6, 8 and 10 in a numerical ratio of 3:2:1.

7. A composition according to claim 3 wherein the fluorochemical is one represented by the formula

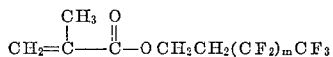

where $n$ is 6, 8 and 10 in a numerical ratio of 3:2:1.

8. A composition according to claim 3 wherein the fluorochemical is one represented by the formula

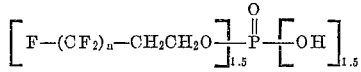

where $n$ is 6, 8 and 10 in a numerical ratio of 3:2:1.

9. A composition according to claim 5 wherein the carrier is water.

10. A composition according to claim 3 wherein the carrier comprises a polyurethane-polyvinyl chloride solution.

11. An article bearing a dried finish of a composition according to claim 1.

12. A synthetic polymeric sueded sheet material having a dried finish of a composition according to claim 5.

13. A synthetic polymeric sueded sheet material having a dried finish of a composition according to claim 8.

14. A synthetic, polymeric sheet material having a dried sueded coating of a composition according to claim 10.

15. An article having deposited thereon (1) a fluorochemical which is (A) a substantially linear polymer of ethylenically unsaturated monomers, at least 35% (by weight) of said monomers being represented by the formula $$CH_2=\overset{R}{\underset{|}{C}}-\overset{O}{\underset{\|}{C}}-X-(CF_2)_mCF_3$$

where

R can be H, —$CH_3$, —$CH_2CH_3$ or halogen;

X can be —O—$(CH_2)_n$—

—NH—$(CH_2)_n$—

—O—$(CH_2)_n$—$\overset{H}{\underset{|}{N}}$—$SO_2$—

—O—$(CH_2)_n$—$\overset{R'}{\underset{|}{N}}$—$SO_2$—

—S—$(CH_2)_n$—

—O—$(CH_2)_n$—$\overset{H}{\underset{|}{N}}$—$SO_2$—$(CH_2)_n$

—O—$(CH_2)_n$—$\overset{R'}{\underset{|}{N}}$—$SO_2$—$(CH_2)_n$— or $-\overset{R'}{\underset{|}{N}}-SO_2-$ where $n$ is a number 1 through 14 and R' is an alkyl radical of 1 through 6 carbon atoms, and $m$ is a number 1 through 13;

(B) a compound represented by the formula

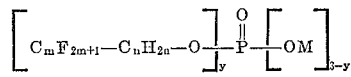

where M is a water solubilizing cation such as hydrogen, alkali-metal, ammonium or substituted ammonium;

$y$ is a number of average value from 1.0 to 2.5;

$m$ is a number 4 through 12;

$n$ is a number 1 through 16;

with $C_m$ and $C_n$ making up a straight chain of not less than 8 carbon atoms; and (2) a curable substantially linear polyorganosiloxane represented by the structure

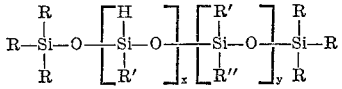

where R, R' and R" can be —$CH_3$, —$C_2H_5$, —$C_3H_7$, phenyl, —$OCH_3$ or —$OC_2H_5$, 60% through 100% (mol) being —$CH_3$ and the silicon atoms within the brackets bearing from 0.3 to 1 hydrocarbon atom and from 1 through 1.7 R groups, the total being two; and $x$ and $y$ are numbers which will give the siloxane a molecular weight of at least 500.

16. A method for making a sueded synthetic polymeric, sheet material oleophobic, hydrophobic, adhesive resistant and burnish resistant, said method comprising:

(a) applying a composition according to claim 1 to at least one surface of said material, and then (b) drying said material.

17. A composition according to claim 5 wherein the carrier is an organic liquid.

References Cited

UNITED STATES PATENTS

| | | | |
|---|---|---|---|
| 3,083,224 | 3/1963 | Brace et al. | 260—978 |
| 3,277,039 | 10/1966 | Marascia et al. | 260—29.6 |
| 3,282,905 | 11/1966 | Fasick et al. | 260—29.6 |
| 2,559,749 | 7/1951 | Benning | 260—29.6 |
| 2,803,615 | 8/1957 | Ahlbrecht et al. | 260—29.6 |
| 3,102,103 | 8/1963 | Ahlbrecht et al. | 260—29.6 |
| 3,203,919 | 8/1965 | Brachman | 260—29.6 |
| 3,256,230 | 6/1966 | Johnson et al. | 260—29.6 |
| 3,256,231 | 6/1966 | Johnson et al. | 260—29.6 |
| 2,559,752 | 7/1951 | Berry | 260—29.6 |
| 3,061,473 | 10/1962 | Tesoro | 260—29.6 |

MURRAY TILLMAN, *Primary Examiner.*

J. L. WHITE, *Assistant Examiner.*

UNITED STATES PATENT OFFICE
CERTIFICATE OF CORRECTION

Patent No. 3,385,812                                   May 28, 1968

Armand E. Brachman

It is certified that error appears in the above identified patent and that said Letters Patent are hereby corrected as shown below:

Column 8, line 73, "0.1" should read -- 1.0 --.

Signed and sealed this 14th day of October 1969.

(SEAL)
Attest:

Edward M. Fletcher, Jr.                       WILLIAM E. SCHUYLER, JR.
Attesting Officer                                   Commissioner of Patents